(12) United States Patent
Ovalle

(10) Patent No.: US 11,107,321 B2
(45) Date of Patent: Aug. 31, 2021

(54) DISTRIBUTED LEDGER BASED GAMING SYSTEM

(71) Applicant: Lottery Now, Inc., San Francisco, CA (US)

(72) Inventor: Gregory Ovalle, San Francisco, CA (US)

(73) Assignee: LOTTERY NOW, INC., Camden, DE (US)

( * ) Notice: Subject to any disclaimer, the term of this patent is extended or adjusted under 35 U.S.C. 154(b) by 0 days.

(21) Appl. No.: 16/437,196

(22) Filed: Jun. 11, 2019

(65) Prior Publication Data

US 2020/0105096 A1 Apr. 2, 2020

Related U.S. Application Data

(60) Provisional application No. 62/683,486, filed on Jun. 11, 2018.

(51) Int. Cl.
*G06F 17/00* (2019.01)
*G07F 17/32* (2006.01)
*H04L 9/32* (2006.01)
*H04L 9/06* (2006.01)

(52) U.S. Cl.
CPC ...... *G07F 17/3244* (2013.01); *G07F 17/3225* (2013.01); *H04L 9/0637* (2013.01); *H04L 9/3239* (2013.01); *H04L 9/3247* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 2015/0141108 A1* | 5/2015 | Kadlec | G07F 17/326 463/17 |
| 2015/0141109 A1* | 5/2015 | Kadlec | G07F 17/3269 463/17 |
| 2018/0247191 A1* | 8/2018 | Katz | G06K 9/00221 |
| 2019/0122300 A1* | 4/2019 | O'Brien | G07F 17/3286 |
| 2019/0163672 A1* | 5/2019 | Shmueli | G06F 16/1824 |
| 2019/0304259 A1* | 10/2019 | Joao | G06Q 50/34 |
| 2019/0370925 A1* | 12/2019 | Edwards | G06F 16/2379 |
| 2020/0027315 A1* | 1/2020 | Cotton | G06Q 20/08 |
| 2020/0152003 A1* | 5/2020 | Georgiou | H04L 9/3297 |
| 2020/0312089 A1* | 10/2020 | Joao | G07F 17/3288 |

(Continued)

*Primary Examiner* — Paul A D'Agostino
(74) *Attorney, Agent, or Firm* — Neo IP

(57) ABSTRACT

A system is provided for securely issuing a ticket for a draw of a game via smart contracts of a blockchain. The system records in the blockchain a game smart contract. The game smart contract records a draw smart contract for issuing tickets for a draw of the game. The game smart contract receives a game place order message indicating placement of an order for a ticket for the draw of the game. The game smart contract sends to the draw smart contract a draw place order message indicating the placement of the order for the ticket for the draw of the game. The game smart contact receives from the draw smart contract a confirmation that the ticket for the draw of the game has been issued. The game smart contract coordinates generation of winning drawlines and directs the draw smart contract to identify winning tickets.

10 Claims, 9 Drawing Sheets

(56) References Cited

U.S. PATENT DOCUMENTS

2020/0372533 A1* 11/2020 Rammal ............ G06Q 20/0457
2020/0380825 A1* 12/2020 Purohit .................. G06F 16/27
2020/0380826 A1* 12/2020 Taylor ................. G07F 17/3225

* cited by examiner

DISTRIBUTED LEDGER BASED GAMING SYSTEM

BACKGROUND

Lotteries are very popular games of chance that are played throughout the world. A lottery may be a draw lottery or an instant lottery. With a draw lottery, a player selects or is given numbers, and winning numbers are later drawn. With an instant lottery, a player is given a ticket with an outcome determined, but the player needs to take some action to reveal the outcome (e.g., scratch a portion of the ticket to reveal a $20 winning). Online Lottery games typically allow players to interact with gaming authorities over the Internet. For example, players may purchase tickets directly from the gaming authority via the Internet and select certain options, such as the numbers to play (referred to as a "drawline") and the specific draw of the game to be played (e.g., a specific week for weekly draws). When a ticket is purchased, the gaming authority issues a lottery ticket to the player that includes the ticket drawline and records that that drawline was played. At the close of a draw, a winning drawline is drawn and publicized. Winning players may be able to collect small payouts from an establishment (e.g., store), referred to as a reseller, that sells tickets. If a payout is large (e.g., a jackpot), however, the winning player may be required to collect the payout from the gaming authority directly so that the identity of the player is known, the proper taxes can be withheld, taxing authorities can be notified, and so on. In addition to lotteries, many different games of chance can be played. Such games include, for example, raffles, Keno, poker, blackjack, roulette, slot machine games, and so on. Games of chance may also depend of external events such as outcome of sporting events (e.g., the FIFA World Cup, the World Series, "The Championships, Wimbledon," and the Kentucky Derby), outcomes of political events (e.g., election of a president or prime minister, passage of a bill by the U.S. Congress), outcome of non-political voting events (e.g., Nobel Peace Prize, Oscar for Best Picture, election of Pope), security or commodity prices (e.g., price of bitcoin or crude oil, stock price of a company, closing price of NASDAQ or DAX), and so on.

Lotteries are typically operated as individual, separate, and distinct gaming operations. Each lottery has its own products, branding, advertising, and marketing. Lotteries that are paper-based typically employ terminals at reseller locations that are connected via dedicated communication links to a central server system that runs computer programs to manage the games of the lottery and store data of the lotteries. Each lottery needs to put teams in place to manage the software and hardware, the delivery of paper tickets, terminal and communication issues, and so on. Each lottery typically purchases the same infrastructure (e.g., hardware, software, and communications links) and pays for maintenance and customization individually.

Lotteries spend significant amounts of money on security. Because of the large sums wagered and paid out, lotteries face threats from both internal and external malicious actors who illegally manipulate wagers or results for their personal gain. To mitigate the effects of these threats, lotteries attempt to secure every aspect of their infrastructure using sophisticated and expensive security techniques such as issuing tickets on special paper ticket stock matched to specific resellers, employing dedicated networks from terminals to a central server system, employing multi-level, role-based security, and so on. Nevertheless, as external threats (e.g., cyberattacks) grow more sophisticated and internal threats more creative, lotteries find it difficult, time-consuming, expensive, and sometimes futile to counteract these threats.

There have been several well-publicized examples of frauds perpetrated by malicious internal actors on lotteries. In one example, the internal head of security of the Multi-State Lottery Association ("MUSL") was the malicious actor who perpetrated a fraud against the U.S. Powerball lottery. MUSL serves lotteries in 33 states and provides the computer systems to generate the random numbers used for several games, including Powerball, Mega Millions, and Hot Lotto. This malicious actor accessed and manipulated the computer systems to select the winning numbers in the same computer system he was responsible for protecting and maintaining. This fraud continued undetected for years. In another example, the operator of the Northstar Lottery (i.e., the Illinois state lottery) purposefully did not award many of the largest prizes in the instant games of the lottery.

Distributed ledgers are currently being used in a wide variety of business applications. The bitcoin system is an example of a distributed ledger. The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Blockchains have been developed to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private key pair. The owner public key or hash of the owner public key is set as the token owner identity, and when performing actions against tokens, ownership proof is established by providing a signature generated by the owner private key and validated against the public key or hash of the public key listed as the owner of the token. A person can be uniquely identified, for example, using a combination of a user name, social security number, and biometric (e.g., fingerprint). The creation of an identity token for an asset in a blockchain establishes provenance of the asset, and the identity token can be used in transactions (e.g., buying, selling, insuring) involving the asset stored in a blockchain, creating a full audit trail of the transactions.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

The term "contract" has been used to describe the computer code of a contract under the UTXO model of bitcoin and the computer code of the "smart contracts" model of the Ethereum platform. The "contracts" under these models are, however, different. In the UTXO model, the distributed ledger is a set of immutable rows keyed by (hash: output index) values. The "hash" is a hash of the transaction that generated the output represented by the row, and the "output index" identifies which one of the possibly many outputs of the transaction that the row represents. A UTXO contract is deterministic and performs no processing other than validating the inputs to the transaction. In the "smart contract" model, the computer code of the smart contract is an instantiation of the computer code that is maintained by every node that stores the blockchain. A "smart contract" can perform virtually any type of processing such as receiving messages, sending messages, accessing external databases, and so on.

DETAILED DESCRIPTION

Figure 1:
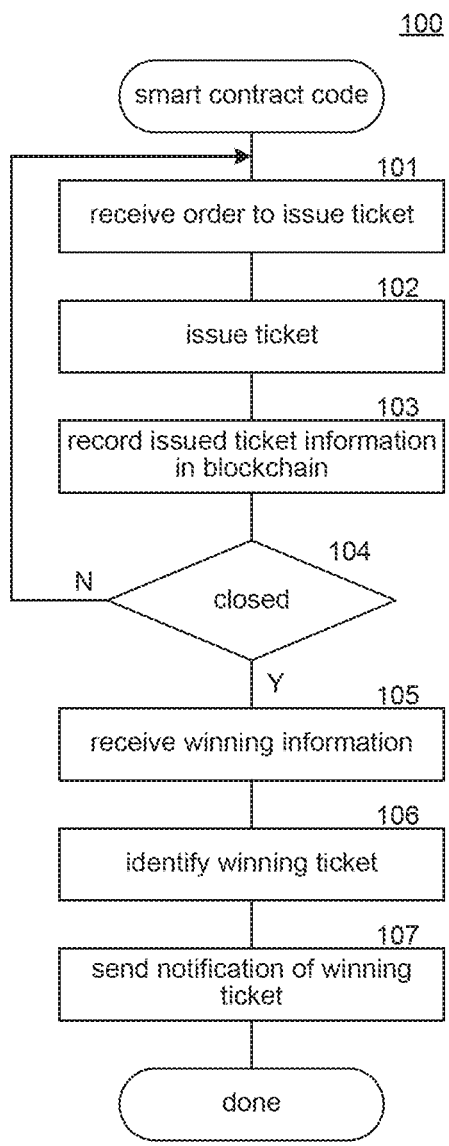
FIG. 1 is a flow diagram that illustrates overall processing of a smart contract of the DLG system in some embodiments.

Methods and systems are provided for issuing tickets for games of chance using smart contracts of a distributed ledger. In some embodiments, a distributed ledger gaming ("DLG") system employs a smart contract for a game of chance to control the operation of the game in a secure and verifiable manner using the distributed ledger. The DLG system records the smart contract in the distributed ledger. For example, if the game is a lottery, the smart contract controls the playing of the lottery. Each different type of game may have a smart contract to support that game. For example, there may be a smart contract to support poker and a smart contract to support roulette. Under control of the smart contract, the DLG system receives orders from players to play the game. When the game is a lottery, an order may include a ticket drawline selected by the player. The DLG system issues tickets for players and records information relating to the tickets issued to the players. When the game is a lottery, the recorded information may include a ticket number for the ticket, the ticket drawline, the draw being played, the reseller through which the ticket was purchased, and so on. When the game (or specific draw of the game) has closed, the DLG system generates winning information, such as a winning drawline for a lottery. The DLG system then uses the recorded information to identify which of the issued tickets are winning tickets. The DLG system then sends notification of the winning tickets to, for example, the resellers or a web site for publication.

In some embodiments, the DLG system provides smart contract code of smart contracts to support a lottery with periodic draws. To support the lottery, the DLG system initially records game smart contract code of a game smart contract in a blockchain, which is a type of distributed ledger. An embodiment of the DLG system is described below that employs a blockchain, but embodiments of the DLG system may employ any type of distributed ledger. The game smart contract code controls the overall playing of the lottery. When the game smart contract code initially executes, it records in the blockchain draw smart contract code of a draw smart contract to control the playing of a specific draw of the lottery and records game configuration information specifying terms of the lottery. The game configuration information may include, for example, the frequency of the draws, the identification of the service that generates the winning drawline, the payout amounts, and so on. The game smart contract code may record a separate instance of the draw smart contract code for each draw that is to be initially open. The game smart contract code receives game place order messages indicating placements of an order for a ticket for a draw of the game. Upon receiving a game place order message, the game smart contract code sends to the draw smart contract code for the draw to be played, a draw place order message indicating the placement of the order for a ticket for that draw of the game with a ticket drawline. Upon receiving the draw place order message, the draw smart contract code records issuance information indicating that a ticket with the ticket drawline has been issued to a player and sends a confirmation message to the game smart contract code. Upon receiving the confirmation message, the game smart contract code may send a notification that the ticket has been issued to, for example, a reseller terminal through which the ticket was purchased or to a device of a player. The notification may include a quick response ("QR") code that encodes the ticket number.

In some embodiments, when draw smart contract code for a draw is recorded in the blockchain, the game smart contract code requests a "cron" service to send a notification at the time the draw is to close. A cron service may be an off-blockchain service that tracks the current time and sends notifications to smart contract code at requested times so that the smart contract code can resume execution to process the notification. When the game smart contract code receives the notification that it is time to end a draw, the game smart contract code may request an off-blockchain random number generator service to generate and provide the winning drawline for the lottery (e.g., six unique random numbers between 1 and 69). When the game smart contract code receives the winning drawline, the game smart contract code sends the winning drawline to the draw smart contract code for the draw that just ended. The draw smart contract code identifies the winning tickets (e.g., based on how many of the numbers of the ticket drawline match the winning drawling) and sends a winning tickets message to the game smart contract code. Upon receiving the winning tickets notification, the game smart contract code may identify whether there are any winning tickets for a jackpot. The game smart contract code may control the moving of funds to pay the winning tickets and may send to a lottery authority a notification of the jackpot winning tickets. The game smart contract code may also record in the blockchain another instance of the draw smart contract code for a new draw so that the same number of draws are always open.

In some embodiments, the DLG system may provide an interface through which players can play without the need to play the game through a reseller with a reseller terminal. The DLG system may provide a player application that is to be executed by a computer of the player, such as a smartphone or a tablet. The player application may allow the player to establish an account with the DLG system through which the player can make payments, purchase tickets, claim winnings, view general gaming statistics, view the player's gaming history, and so on. To support use of cryptocurrencies, the DLG system may interface with exchange systems to exchange payment in a cryptocurrency to a fiat currency. The DLG system may record an accounting smart contract in the blockchain to record the account information of the players. The account information may be recorded in a sidechain for easy access by a player with a proof of the account information (e.g., hash) stored in the blockchain.

FIG. 1 is a flow diagram that illustrates overall processing of a smart contract of the DLG system in some embodiments. The smart contract 100 is recorded in a blockchain and resumes execution when messages are sent to it. In block 101, the smart contract accesses a place order message that causes the smart contract to resume execution. The place order message is a request to issue a ticket. The message may be sent by a reseller terminal, a gateway system of the DLG system that receives orders from reseller terminals, and so on. In block 102, the smart contract issues a ticket. In block 103, the smart contract records information relating to the issued ticket in the blockchain. The recorded information may include the ticket drawline, the amount played, and so on. In decision block 104, if the smart contract has received a notification that the game has ended or closed, then the smart contract continues at block 105, else the smart contract code loops to block 101 to wait for the next place order message to resume execution. In block 105, the smart contract code requests and receives winning information, such as the winning drawline from a random number generator service. In block 106, the component identifies any winning tickets, for example, by comparing the winning drawline to the ticket drawlines that have been recorded. In block 107, the component sends a notification of the winning tickets and then completes.

The DLG system may record a transaction in the blockchain or in a sidechain for each issued ticket with the player as the owner of the ticket. The owner can transfer the ticket to a new owner by a transaction that designates the address of the new owner and that is signed by private key of the current owner as evidence that the new owner is now the current owner. The DLG system may support ownership by multiple players. For example, workers in an office may pool their funds to purchase a block of tickets. The DLG system may designate each worker as an owner of each ticket. In such a case, the signature of each owner may be required to transfer ownership of a ticket. The DLG system may support a multi-signature transaction such as a multi-sig feature of the bitcoin system.

The DLG system may support a person (i.e., gifter) giving a ticket for a game to another person (i.e., giftee) as a gift. A gifter may interact with a reseller system or directly with the DLG system (e.g., via a web page) to purchase a ticket that is designated as a gift for the gifter who may be identified by their blockchain address, electronic mail address, telephone number, and so on. The DLG system records a transaction in the blockchain for the ticket with gifter as the owner. The DLG system then notifies the giftee that the gifter has given a ticket to the giftee. The giftee then interacts with a reseller system or directly with the DLG to accept the ticket as a gift, which may include agreeing to the terms of the game. When the giftee indicates their acceptance of the ticket, the DLG system records a transaction to transfer ownership of the ticket from the gifter to the giftee. If the giftee does not accept the ticket as a gift, then the gifter remains owner of the ticket. The DLG system may allow the gifter to withdraw the gift prior to its acceptance by the giftee. A person who already owns a ticket may also give the ticket to another person by indicating that the ticket is now being given as a gift to a giftee. For example, a giftee who has accepted a ticket as a gift can "re-gift" the ticket to give the ticket to another person.

DLG System

Figure 2:
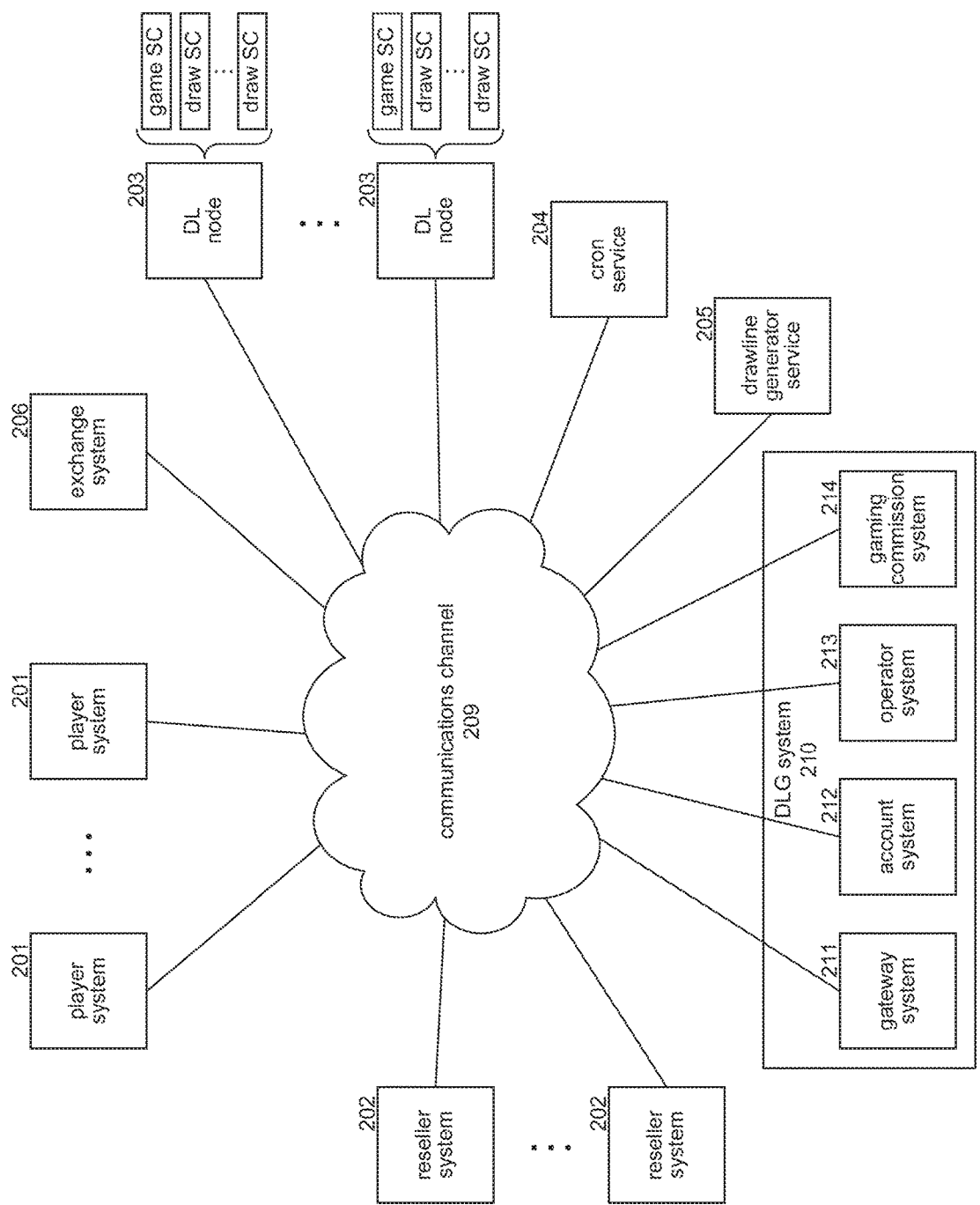
FIG. 2 is a block diagram that illustrates computer systems of the DLG system and systems that interact with the DLG system in some embodiments.

FIG. 2 is a block diagram that illustrates computer systems of the DLG system and systems that interact with the DLG system in some embodiments. The DLG system 210 may include a gateway system 211, an account system 212, an operator system 213, and a gaming commission system 214. The DLG system interacts with player systems 201, reseller systems 202, distributed ledger nodes 203, a cron service 204, a drawline generator service 205, and an exchange system 206 via communications channel 209. The gateway system controls the overall playing of a game, including recording smart contracts in the blockchain, receiving ticket orders from reseller systems and player systems, exchanging currencies, notifying winners, and so forth. The account system may interact with reseller systems and player systems to maintain information on the accounts of players and resellers. The operator system provides services to an operator or gaming authority of a game. The gaming commission system provides services so that a gaming commission can monitor the gaming activities. The player systems allow players to interact with the gateway system to play games. The reseller systems allow resellers to submit ticket orders on behalf of players and issue tickets. The distributed ledger nodes each implement a copy of the blockchain, which includes transactions with game smart contract code and draw smart contract code. The cron service receives requests from smart contracts to provide timing notifications and sends timing notifications to the smart contracts as requested. The drawline generator service may implement a random number generator that generates winning drawlines and may be implemented as an oracle service to smart contracts. The random number generator may be a distributed autonomous organizational random number generator such as RANDAO. The exchange system may allow the gateway system to exchange payments made via cryptocurrency to a fiat currency.

The computing systems (e.g., network nodes or collections of network nodes) on which the DLG system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the DLG system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The DLG system may be described in the general context of computer-executable instructions, such as program modules and components, executed by one or more computers, processors, or other devices. Generally, program modules or components include routines, programs, objects, data structures, and so on that perform tasks or implement data types of the DLG system. Typically, the functionality of the program modules may be combined or distributed as desired in various examples. Aspects of the DLG system may be implemented in hardware using, for example, an application-specific integrated circuit ("ASIC") or field programmable gate array ("FPGA").

Figure 3:
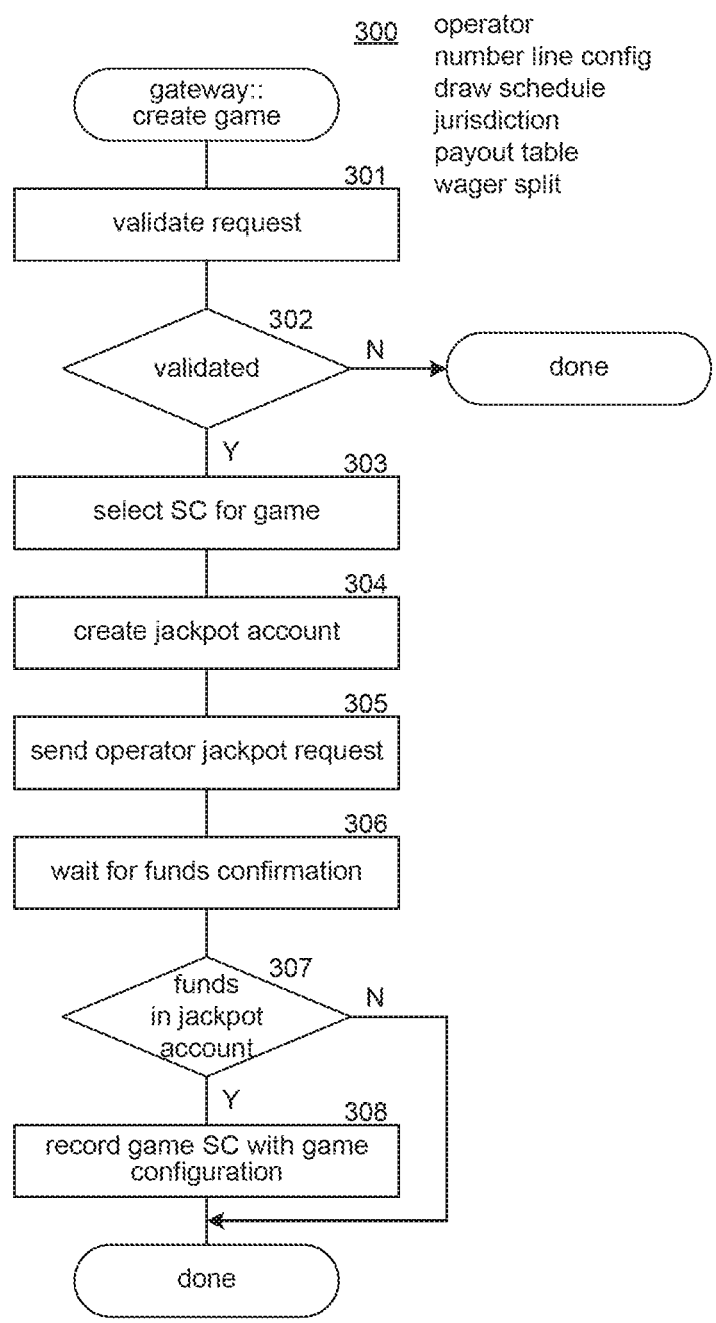
FIG. 3 is a flow diagram that illustrates processing of a create game component of the gateway system of the DLG system in some embodiments.

FIG. 3 is a flow diagram that illustrates processing of a create game component of the gateway system of the DLG system in some embodiments. The create game component 300 is invoked when an operator sends a request to create a new game. In this example, the game is assumed to be a lottery. The component may be provided with an indication of the operator, a drawline configuration (e.g., six numbers between one and 69), a draw schedule (e.g., biweekly), a payout table, the jurisdictions from which the game can be played, and a wager split indicating how to split the wager between various entities. The payout table indicates the amount of the payout for various types of winning tickets. For example, if the game is a lottery, then the payout table may indicate a payout amount for each of three, four, five, or six matching numbers based on whether a powerball number also matches. If the game is poker, then the payout table may indicate a payout amount for each of a pair, two pairs, three of a kind, a straight, a flush, a full house, four of a kind, a straight flush, and a royal straight flush. In block 301, the component validates the request, for example to ensure that the operator is authorized and that the drawline configuration can be supported. In decision block 302, if the request is validated, then the component continues at block 303, else the component completes. In block 303, the component selects a game smart contract for the game. In block 304, the component creates a jackpot account for the operator to deposit funds for payment of jackpots. In block 305, the component sends to the operator a jackpot request to fill the jackpot account. In block 306, the component waits for confirmation that the funds have been deposited in the jackpot account. In decision block 307, if sufficient funds have been deposited in the jackpot account by a specified time, then the component continues at block 308, else the component completes. In block 308, the component records the selected game smart contract with game configuration information in the blockchain and then completes.

Figure 4:
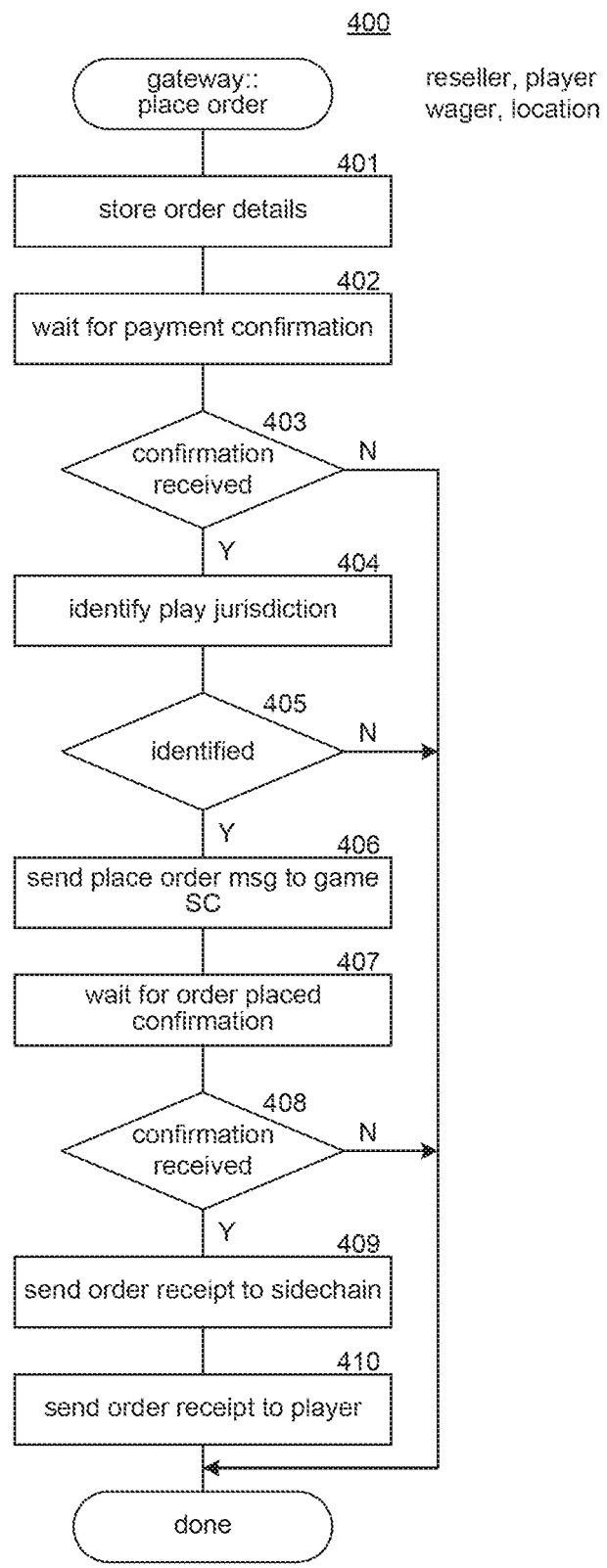
FIG. 4 is a flow diagram that illustrates the processing of a place order component of the gateway system of the DLG system in some embodiments.

FIG. 4 is a flow diagram that illustrates the processing of a place order component of the gateway system of the DLG system in some embodiments. The place order component 400 may be invoked, passing a place order request indicating the entity placing the order (e.g., reseller or player), a wager, a location, and so on. The wager may indicate the amount waged, the game to play, the draw to play, and a drawline. The place order component directs the placement of an order in accordance with the place order request. In block 401, the component stores details of the placed order. In block 402, the component waits for payment confirmation to confirm that the entity placing the order has paid. In decision block 403, if the confirmation is received by a specified time, then the component continues at block 404, else the component completes. In block 404, the component identifies the jurisdiction of the location of the player. In decision block 405, if the identified jurisdiction is within a jurisdiction that is authorized by the game, then the component continues at block 406, else the component completes. In block 406, the component sends a game place order message to the game smart contract. In block 407, the component waits for an order confirmation message from the game smart contract. In decision block 408, if the order confirmation is received by a specified time, then the component continues at block 409, else the component completes. In block 409, the component records an order receipt transaction in a sidechain that records information related to orders. In block 410, the component sends an order receipt to the player and completes. A player may use an order receipt to access the information of the sidechain to verify placement of the order and to transfer ownership of the ticket.

Figure 5:
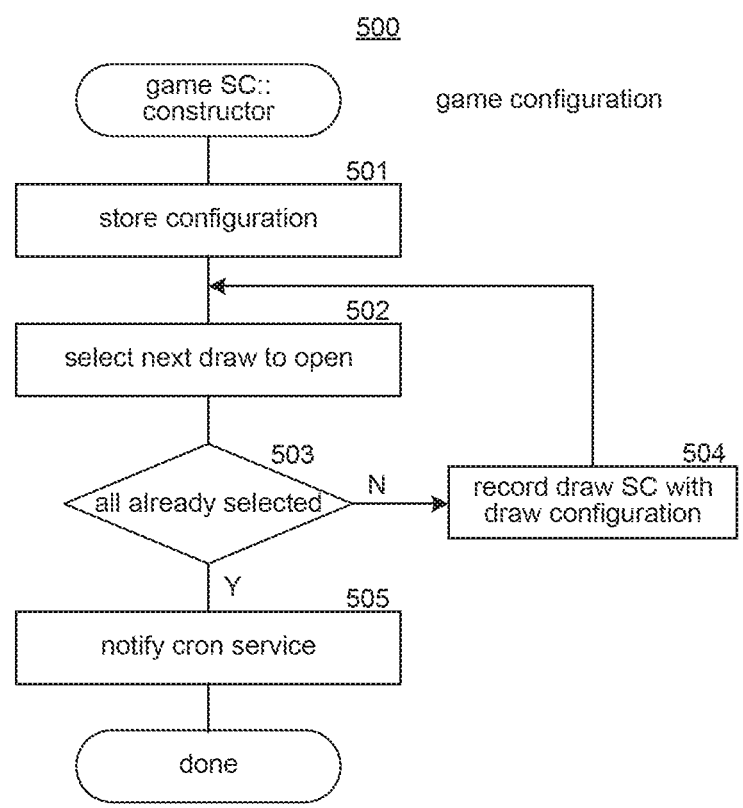
FIG. 5 is a block diagram that illustrates processing of a constructor component of game smart contract code of the DLG system in some embodiments.

FIG. 5 is a block diagram that illustrates processing of a constructor component of game smart contract code of the DLG system in some embodiments. The constructor component 500 is invoked, passing game configuration information. In block 501, the component stores the game configuration information. In block 502, the component selects the next draw to open. For example, the game configuration information may specify to open five weekly draws. In decision block 503, if all the draws have already been opened, then the component continues at block 505, else the component continues at block 504. In block 504, the component records the draw smart contract in the blockchain with draw configuration information derived from the game configuration. The component then loops to block 502 to select the next draw to open. In block 505, the component notifies the cron service to provide a notification of when each draw is to close. The component then completes.

Figure 6:
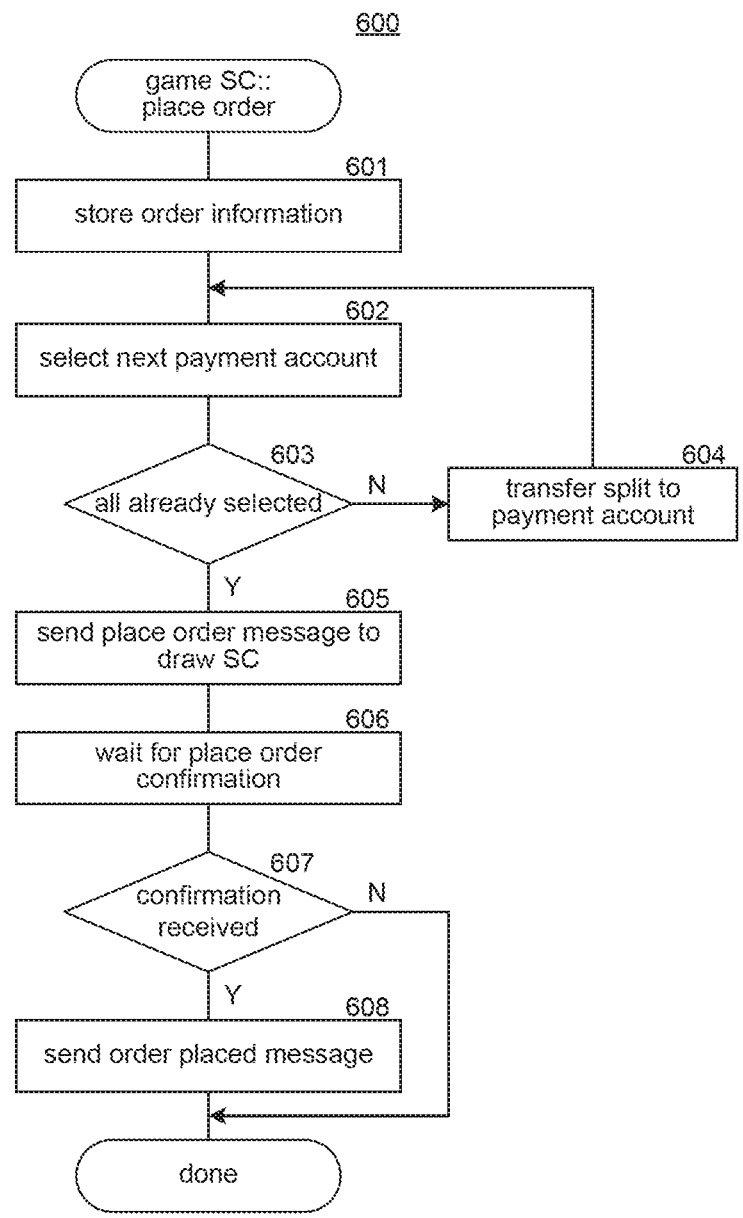
FIG. 6 is a flow diagram that illustrates the processing of a place order component of a game smart contract of the DLG system in some embodiments.

FIG. 6 is a flow diagram that illustrates the processing of a place order component of a game smart contract of the DLG system in some embodiments. The place order component 600 is invoked when a game place order message is received by the game smart contract. The component coordinates the placing of the order. In block 601, the component stores information relating to the order. In blocks 602-604, the component loops, distributing splits of the wager to the appropriate accounts. For example, the retailer, the DLG system operator, a gaming commission, and the game operator may each get a certain percentage of each wager as specified by the game configuration information. In block 602, the component selects the next payment account to be paid. In decision block 603, if all the payment accounts have already been selected, then the component continues at block 605, else the component continues at block 604. In block 604, the component transfers a split of the wager to the selected payment account and then loops to block 602 to select the next payment account. In block 605, the component sends a draw place order message to the draw smart contract for the draw being played. In block 606, the component waits for a place order confirmation from the draw smart contract. In decision block 607, if the confirmation is received within a specified time, then the component continues at block 608, else the component completes. In block 608, the component sends a confirmation message to the gateway system and completes.

Figure 7:
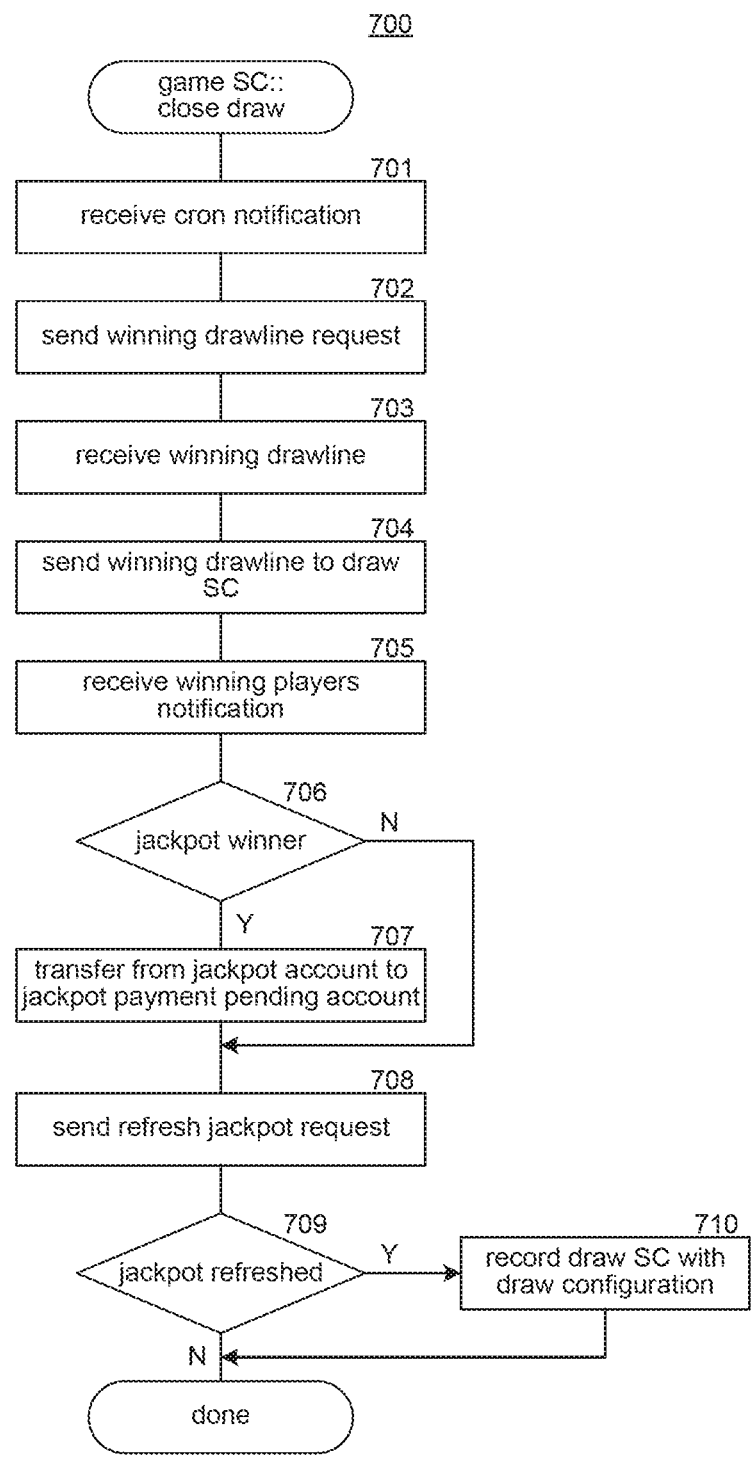
FIG. 7 is a flow diagram that illustrates the processing of a close draw component of a game smart contract of the DLG system in some embodiments.

FIG. 7 is a flow diagram that illustrates the processing of a close draw component of a game smart contract of the DLG system in some embodiments. The close draw component 700 is invoked when a cron notification is received that a draw is to close. In block 701, the component accesses the cron notification. In block 702, the component sends a winning drawline request to a drawline generator. In block 703, the component receives a winning drawline from the drawline generator. In block 704, the component sends an indication of the winning drawline to the draw smart contract code for the draw. In block 705, the component receives a winning players notification from the draw smart contract. In decision block 706, if there is a jackpot winner, then the component continues at block 707, else the component continues at block 708. In block 707, the component transfers money to cover the jackpot from a jackpot account to a jackpot payment pending account. In block 708, the component sends a refresh jackpot request to the game operator. Both jackpot and non-jackpot amounts may be paid from the jackpot account of the game operator. In decision block 709, if the jackpot has been refreshed, then the component continues at block 710, else the component completes. In block 710, the component records a draw smart contract with the draw configuration to ensure that the specified number of draws are open and then completes.

Figure 8:
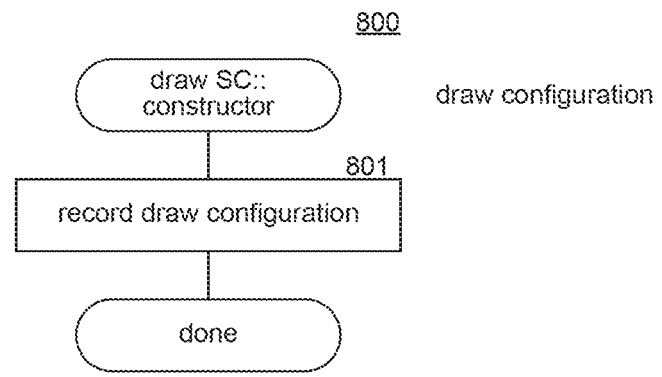
FIG. 8 is a flow diagram that illustrates the processing of a constructor component of a draw smart contract of the DLG system in some embodiments.

FIG. 8 is a flow diagram that illustrates the processing of a constructor component of a draw smart contract of the DLG system in some embodiments. The constructor component 800 is invoked, passing an indication of a draw configuration, such as a specification of characteristics of the drawline to validate orders and a specification of which drawlines are winning drawlines. In block 801, the component records the draw configuration information and completes.

Figure 9:
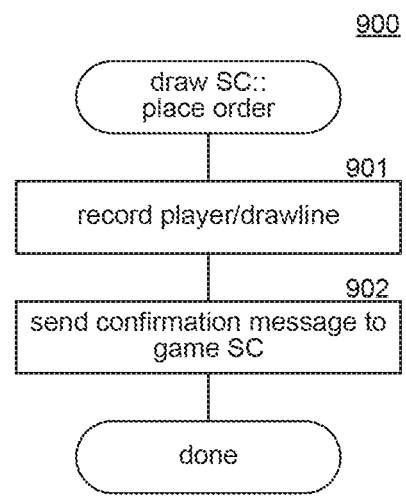
FIG. 9 is a flow diagram that illustrates the processing of a place order component of a draw smart contract of the DLG system in some embodiments.

FIG. 9 is a flow diagram that illustrates the processing of a place order component of a draw smart contract of the DLG system in some embodiments. A place order component 900 is invoked when a draw place order message is received by the draw smart contract. In block 901, the component records an indication of the player who purchased the ticket and the drawline selected by the player. The component may also validate the order. In block 902, the component sends a confirmation message to the game smart contract component and then completes.

Figure 10:
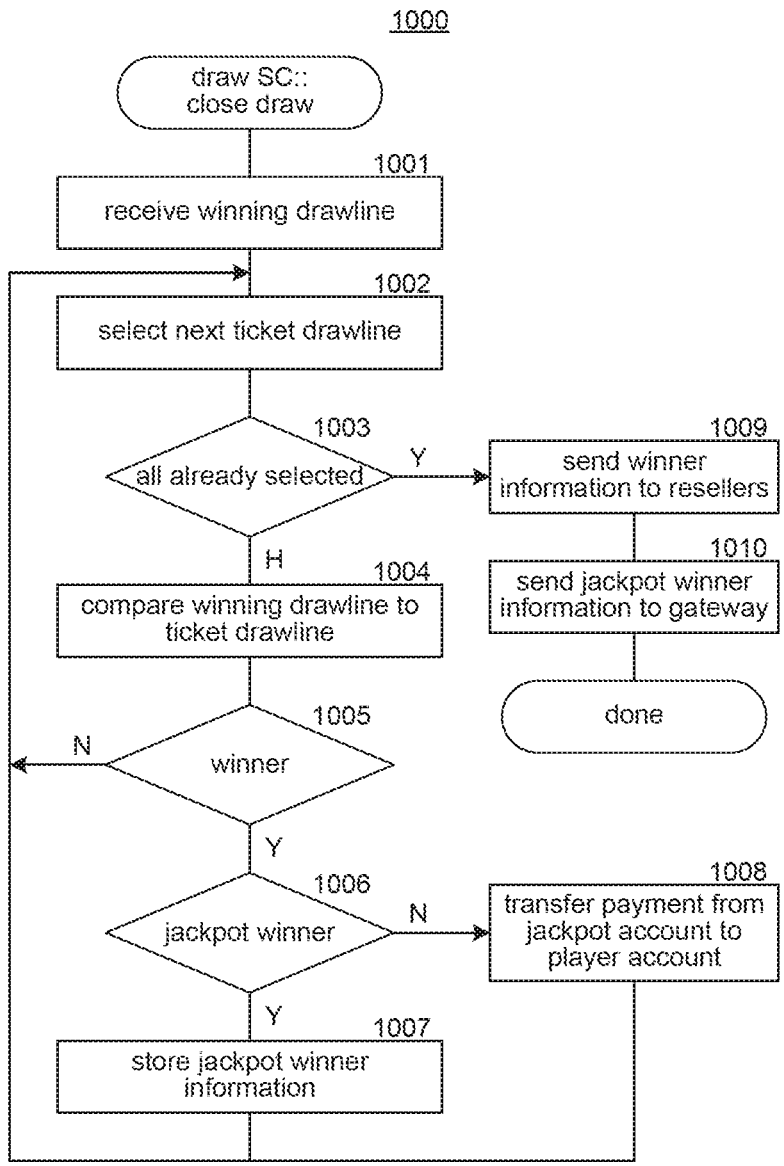
FIG. 10 is a flow diagram that illustrates the processing of a close draw component of a draw smart contract of the DLG system in some embodiments.

FIG. 10 is a flow diagram that illustrates the processing of a close draw component of a draw smart contract of the DLG system in some embodiments. The close draw component 1000 is invoked when the game smart contract determines that the draw represented by this instance of the draw smart contract code has ended. In block 1001, the component receives the winning drawline, which was included in the message from the game smart contract. In block 1002, the component selects the next ticket drawline that was played. In decision block 1003, if all the ticket drawlines have already been selected, then the component continues at block 1009, else the component continues at block 1004. In block 1004, the component compares the winning drawline to the selected ticket drawline. In decision block 1005, if the selected ticket drawline is a winner, then the component continues at block 1006, else the component loops to block 1002 to select the next ticket drawline. In decision block 1006, if the ticket drawline is a jackpot winner, then the component continues at block 1007, else the component continues at block 1008. In block 1007, the component stores jackpot winner information and then loops to block 1002 to select the next ticket drawline. In block 1008, the component transfers a payment from the jackpot account to the player's account and then loops to block 1002 to select the next ticket drawline. In block 1009, the component sends winner information to the resellers who sold the winning tickets. Alternatively, the game smart contract may be responsible for such transfers and notifying resellers. In block 1010, the component sends jackpot winner information to the game smart contract and completes.

The following paragraphs describe various embodiments of aspects of the DLG system. An implementation of the DLG system may employ any combination of the embodiments. The processing described below may be performed by a computing system with a processor that executes computer-executable instructions stored on a computer-readable storage medium that implements the DLG system.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by one or more computing systems for managing a game, the method comprising:
   recording in a blockchain smart contract code for the game; and
   under control of the smart contract code,
   in response to receiving orders to issue tickets for players,
   issuing the tickets for the players; and
   recording in the blockchain an indication of the tickets issued to the players; and
   when the game has closed,
   generating winning information; and
   identifying which of the issued tickets are winning tickets based on comparison of the issued tickets to the winning information;
   sending a notification of the winning tickets;
   recording the winning tickets in the blockchain;
   if one or more jackpot winning tickets are present in the winning tickets:
   identifying the one or more jackpot winning tickets from the winning tickets and one or more jackpot winners, wherein the one or more jackpot winning tickets are awarded by a lottery authority;
   sending a notification of the one or more jackpot winning tickets to the lottery authority;
   creating one or more jackpot accounts; and
   recording jackpot winner information in the blockchain.

2. The method of claim 1 wherein the winning information is provided by a drawline generator service or the winning information is generated via a commit/reveal scheme.

3. The method of claim 1 wherein the generating of the winning information includes requesting a winning information generator that is not on the blockchain to generate the winning information, and wherein the winning information generator is a decentralized autonomous organizational random number generator.

4. The method of claim 1 wherein the recording of the smart contract code includes recording game smart contract code and, for a draw of the game, an instance of draw smart contact code.

5. The method of claim 4 wherein the recording of the smart contract code includes recording an instance of draw smart contract code for each open draw, wherein when an open draw closes, recording an instance of a draw smart contract for a draw to be open.

6. The method of claim 4 wherein a timer service that is not on the blockchain sends a close message to the smart contract code indicating that a draw has closed.

7. The method of claim 1 wherein a timer service that is not on the blockchain sends a close message to the smart contract code indicating that the game has closed.

8. The method of claim 1 further comprising, for a winning ticket, transferring a payout from an account of the game to an account of the player to whom the winning ticket was issued, wherein the payout is via a game token and/or cryptocurrency, wherein the game token and/or cryptocurrency can be exchanged to a fiat currency via an exchange system.

9. The method of claim 1 further comprising recording in a sidechain to the blockchain information relating to the issued tickets and providing receipt information for an issued ticket to a player wherein the player can use the receipt information to access the sidechain to verify the issued ticket, wherein a hash of the sidechain is recorded in the blockchain as evidence of the information relating to the issued tickets.

10. A system for managing a game comprising:
   one or more computer-readable storage mediums storing computer-executable instructions run on at least one platform; and
   one or more processors for executing the computer-executable instructions stored in the one or more computer-readable storage mediums;

wherein the at least one platform is operable to record in a blockchain smart contract code for the game;

wherein the smart contract code is operable to receive at least one order to issue at least one ticket to at least one player of the game;

wherein the smart contract code is operable to issue the at least one ticket to the at least one player in response to the at least one order;

wherein the smart contract code is operable to record in the blockchain an indication of the at least one ticket;

wherein the smart contract code is operable to generate winning information when the game is closed;

wherein the smart contract code is operable to compare the at least one ticket to the winning information, thereby identifying winning tickets;

wherein the smart contract code is operable to send a notification of the winning tickets;

wherein the smart contract code is operable to identify one or more jackpot winning tickets from the winning tickets and one or more jackpot winners, wherein the one or more jackpot winning tickets are awarded by a lottery authority;

wherein the smart contract code is operable to send a notification of the one or more jackpot winning tickets to the lottery authority;

wherein the smart contract code is operable to create one or more jackpot accounts; and wherein the smart contract code is operable to record the winning tickets and jackpot winner information in the blockchain.

* * * * *